(12) United States Patent
Leen et al.

(10) Patent No.: US 7,021,623 B2
(45) Date of Patent: Apr. 4, 2006

(54) SYSTEM AND METHOD FOR ADDING A SKILL ASPECT TO GAMES OF CHANCE

(75) Inventors: Fergus A. Leen, Wimbledon Park (GB); Sam B. Lawrence, London (GB); David G. McNally, Wimbledon (GB); Clive Hetherington, Huddersfield (GB); David M. McDowell, London (GB); Kevin R. O'Neal, London (GB)

(73) Assignee: GameAccount Limited, London (GB)

( * ) Notice: Subject to any disclaimer, the term of this patent is extended or adjusted under 35 U.S.C. 154(b) by 38 days.

(21) Appl. No.: 10/193,817

(22) Filed: Jul. 12, 2002

(65) Prior Publication Data

US 2003/0042672 A1    Mar. 6, 2003

Related U.S. Application Data

(60) Provisional application No. 60/305,148, filed on Jul. 13, 2001.

(51) Int. Cl.
*A63B 71/00* (2006.01)

(52) U.S. Cl. .................. 273/138.1; 273/146; 273/246; 273/248; 273/249

(58) Field of Classification Search ............. 273/138.1, 273/234, 246, 248–249, 166, 146
See application file for complete search history.

(56) References Cited

U.S. PATENT DOCUMENTS

| | | | | |
|---|---|---|---|---|
| 3,856,308 A | * | 12/1974 | Breslow et al. ............. | 273/241 |
| 3,895,804 A | * | 7/1975 | Lee .............................. | 273/242 |
| 4,053,157 A | * | 10/1977 | Cowan ........................ | 273/256 |
| 4,058,319 A | * | 11/1977 | Thomas et al. ............. | 273/248 |
| 4,323,248 A | * | 4/1982 | Zingale ....................... | 273/236 |
| 4,569,526 A | * | 2/1986 | Hamilton .................... | 273/242 |
| 4,666,160 A | * | 5/1987 | Hamilton .................... | 273/242 |

(Continued)

FOREIGN PATENT DOCUMENTS

WO    WO 99/26204    5/1999

(Continued)

OTHER PUBLICATIONS

John Scarne- Scarne's Encyclopedia of Games—1973—Harper & Row- pp. 522-531.*

(Continued)

*Primary Examiner*—Eugene Kim
*Assistant Examiner*—Dolores Collins
(74) *Attorney, Agent, or Firm*—Baker Botts L.L.P.

(57) ABSTRACT

A system and methods are provided in which a certain level of the chance aspect of a game or other application is removed and a certain level of a skill aspect is added. This may be accomplished by using an indicator to establish a predetermined number of move numbers for one or more players in the game. For example, the indicator may be used to determine a first group of move numbers for a first player and a second group of move numbers for a second player. The players use the pre-established move numbers to advance according to the rules of the game. Depending on the particular embodiment, the move numbers within a group may be sequenced or non-sequenced. Move numbers may be replaced at each player's turn or when all or a subset of the move numbers of a group are used. Move numbers may be established by any type of indicator such as dice, dominos, or a random number generator. In some embodiments, move numbers may be traded in. Move numbers may or may not be visible at predetermined times to one or more players.

26 Claims, 5 Drawing Sheets

U.S. PATENT DOCUMENTS

| | | | |
|---|---|---|---|
| 4,819,818 A * | 4/1989 | Simkus et al. | 463/22 |
| 4,881,740 A * | 11/1989 | Odhner | 273/248 |
| 5,085,441 A * | 2/1992 | Jova | 273/248 |
| 5,238,249 A * | 8/1993 | Elias et al. | 463/22 |
| 5,340,113 A * | 8/1994 | Respicio | 273/249 |
| 5,370,397 A * | 12/1994 | Miller et al. | 273/283 |
| 5,507,489 A * | 4/1996 | Reibel et al. | 463/17 |
| 5,795,226 A * | 8/1998 | Yi | 463/22 |
| 6,116,601 A * | 9/2000 | Kornafel, Jr. | 273/249 |
| 6,119,229 A * | 9/2000 | Martinez et al. | 713/200 |
| 6,176,487 B1 * | 1/2001 | Eklund et al. | 273/249 |
| 6,203,017 B1 * | 3/2001 | Schultz | 273/285 |
| 6,286,833 B1 * | 9/2001 | Collins | 273/243 |
| 6,481,714 B1 * | 11/2002 | Jacobs | 273/236 |
| 6,575,463 B1 * | 6/2003 | Wintersteen | 273/261 |
| 6,581,932 B1 * | 6/2003 | Jacobs | 273/236 |
| 6,592,123 B1 * | 7/2003 | Mattlage et al. | 273/261 |
| 6,602,136 B1 * | 8/2003 | Baerlocher et al. | 463/16 |

FOREIGN PATENT DOCUMENTS

| | | |
|---|---|---|
| WO | WO 00/79464 A1 | 12/2000 |
| WO | WO 01/01319 A1 | 1/2001 |
| WO | WO 01/05477 A2 | 1/2001 |
| WO | WO 01/41447 A1 | 6/2001 |

OTHER PUBLICATIONS

Jojn Belton- Domino Games—1931—Raintree Editions—pp. 7-10.*

PCT Report for PCT/EP 02/ 07806, Jan. 2, 2003.

Patent Pending U.S. Appl. No. 10/194,358, entitled "System and Method for Providing Game Event Management To A User of a Gaming Application," by Fergus A. Leen et al., 68 total pages, Jul. 12, 2002.

Patent Pending U.S. Appl. No. 10/193,971, entitled "System and Method for Matching Users of a Gaming Application," by Fergus A. Leen et al., 64 total pages, Jul. 12, 2002.

Patent Pending U.S. Appl. No. 10/193,978, entitled "System and Method for Generating Statistics For a User of a Gaming Application," by Fergus A. Leen et al., 70 total pages, Jul. 12, 2002.

Patent Pending U.S. Appl. No. 10/194,018, entitled "System and Method for Providing Game Advice to a User of a Gaming Application," by Fergus A. Leen et al., 69 total pages, Jul. 12, 2002.

Patent Pending U.S. Appl. No. 10/193,977, entitled "System and Method for Determining the Outcome of a Wager for a Gaming Application," by Fergus A. Leen et al., 69 total pages, Jul. 12, 2002.

Patent Pending U.S. Appl. No. 10/194,186, entitled "System and Method for Establishing a Wager for a Gaming Application," by Fergus A. Leen et al., 72 total pages, Jul. 12, 2002.

Patent Pending U.S. Appl. No. 10/194,019, entitled "System and Method for Generating Profile Information For a User of a Gaming Application," by Fergus A. Leen et al., 69 total pages, Jul. 12, 2002.

Patent Pending U.S. Appl. No. 10/193,980, entitled "System and Method for Providing Enhanced Services To A User of a Gaming Application," by Fergus A. Leen et al., 68 total pages, Jul. 12, 2002.

* cited by examiner

SYSTEM AND METHOD FOR ADDING A SKILL ASPECT TO GAMES OF CHANCE

CROSS REFERENCE TO RELATED APPLICATION

This application is related to and claims the benefit of U.S. Provisional Application No. 60/305,148 filed Jul. 13, 2001.

TECHNICAL FIELD OF THE INVENTION

The invention relates generally to games in which there is an aspect of chance due to moves being based on randomly-generated numbers and, more particularly, to adding an aspect of skill to such games by adding a level of predictability to the determination of the numbers on which moves will be based.

BACKGROUND OF THE INVENTION

Many conventional games are considered games of chance due to the fact that moves during the game are based on numbers that are randomly generated. For example, in backgammon, moves are made on the basis of the roll of a pair of dice. Typically, each die has six sides, each of which has one or more dots representing the numbers one through six. A roll of the pair of dice results in a combination of two numbers, each of the two numbers being any number from one through six. Although there are only a certain number of combinations for the pair of dice, any combination can occur on any roll. In backgammon, a player moves pieces based on this randomly-generated combination of numbers. If a player rolls a two-six combination, for instance, the player may move one piece two spikes (i.e., spaces) and another piece six spikes. Optionally, the player may move one piece eight (two plus six) spikes.

Thus, in the conventional backgammon game, as in many games, there exists a certain level of skill. The player must determine how best to use the number or numbers which are generated at the beginning of the player's turn. However, in conventional games, at the beginning of the player's turn, the player cannot predict with any certainty what the number or numbers will be which will govern how the player moves (or otherwise takes some action according to the rules of the particular game).

There is a known version of backgammon according to the rules of which a certain level of predictability is added regarding the numbers by which the players will make moves. According to this known variation, the dice are replaced by standard dominos. Twelve dominos per players are aligned on each player's respective side of the backgammon board. The dominos represent dice rolls, which is possible because a standard domino has a side with two halves, each half having dots representing numbers. Each player has the same number of dominos and both players can see all of the dominos, including the dominos to be used by the other player. The dominos can be used by the players in any order they choose. Once a group of the dominos is used, it is replaced by another group of twelve dominos.

SUMMARY OF THE INVENTION

The present invention is directed to a system and methods for removing a certain level of the chance aspect of a game or other application and adding a certain level of a skill. The game or application may involve a user that makes moves according to numbers provided by an indicator such as a die, for example.

In one embodiment, the method includes using an indicator to determine one or more numbers and advancing a number of positions corresponding to the one or more numbers. The using the indicator step may include activating the indicator a predetermined number of times to determine a first sequence of one or more move numbers. The advancing step may include advancing a first time by a number of positions corresponding to the first move number of the first sequence of move numbers and then advancing a second time by a number of positions corresponding to the second move number of the sequence of move numbers.

In another embodiment, the method includes using an indicator a first time to determine one or more numbers and advancing a number of positions corresponding to the one or more numbers. The using the indicator step may include activating the indicator a predetermined number of times to determine a first group of one or more move numbers. The advancing step may include advancing a first time by a number of positions corresponding to a first move number of the first group of move numbers. The method may further include using the indicator a second time to determine a substitute move number to replace the first move number of the first group of move numbers.

According to another embodiment a system is provided for executing a game or other application in which users make moves. The system may include a processor and an application operable to be executed by the processor. The application may be operable to perform any method, or a combination of methods, as described herein and/or within the scope of the present invention.

The invention encompasses additional variations, features, modifications, and the like and is not intended to be limited to the specific example embodiments described herein.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

The present invention provides for replacing a certain amount of the chance aspect of a game with a certain level of predictability. This increases the amount that skill affects the course and outcome of the game. The detailed description is based mainly on the example of backgammon. However, various embodiments have applicability to other games. Thus, various embodiments are intended to apply to any game in which moves (which may include movement of pieces, advancements, or any other type of player activity) are determined at least in part by the generation of a number or combination of numbers. As described herein, the generation of a number is intended to include the generation of a single number or multiple numbers such as a combination of numbers. A number can be generated by the activation of an indicator, such as a domino, a die (or multiple dice, such as a pair of dice), a computerized, random-number generator, or any other indicator, which can provide a number on which game moves can be based. The various embodiments also apply to any application in which a move is based on a number. Thus, the various embodiments also apply to applications that might not be strictly considered games.

Figure 1:
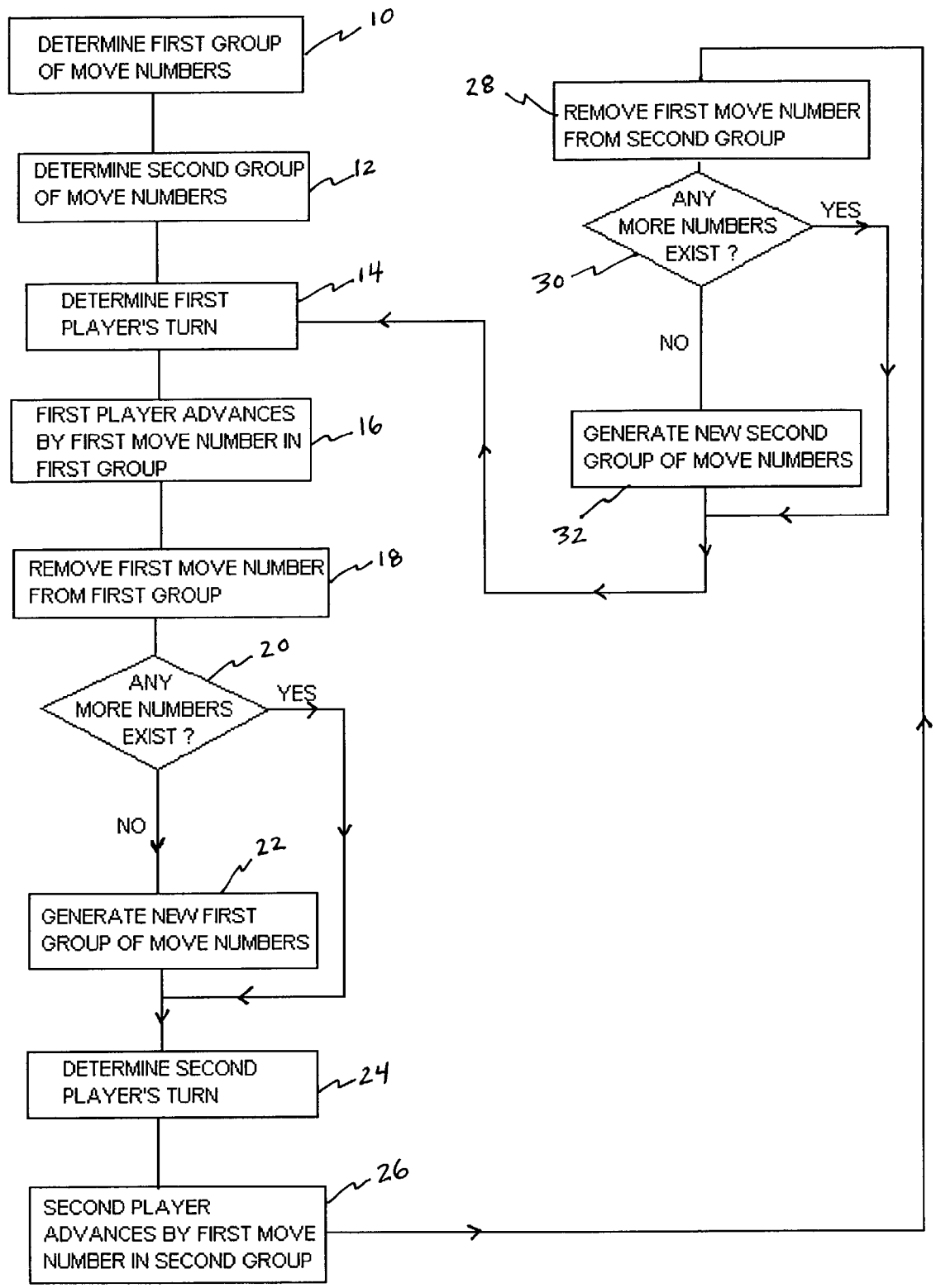
FIG. 1 is a flow chart representing a method in accordance with an embodiment of the present invention.

According to an embodiment of the invention, and in connection with FIG. 1, a method of playing a game is provided in which a certain level of the chance aspect of the game is replaced by a certain level of a skill aspect. According to the method, at step 10, an indicator is used to determine a first group of move numbers. At step 12, the indicator is used to determine a second group of move numbers. The first and second groups of move numbers each includes one or more move numbers. For example, each of the first and second groups of move numbers may include five move numbers. However, this is intended as an example only, and the groups of move numbers may include any predetermined number of move numbers. Preferably, the number of move numbers in the first group is equal to the number of move numbers in the second group. However, the number of move numbers in each group of move numbers can vary. In the example shown in FIG. 1, only two groups of move numbers are determined. This might be preferable, for instance, if there are two players in the game. However, more or fewer groups may be determined. For instance, it is possible for only one group of move numbers to be determined, even if there are two or more players. Alternatively, there may be more than two players and it might be desirable to have a number of groups of move numbers corresponding to the number of players. Further, the numbers in each group may be sequenced in the order in which they were determined by activation of the indicator.

At step 14, a first player's turn is determined. At step 16, the first player advances a first time by a number of positions corresponding to the first move number of the first group of move numbers. At step 18, the first move number used by the first player is removed from the first group of move numbers. At step 20, it is determined whether any more numbers exist in the first group of move numbers. If no more numbers exist, the method advances to step 22, where the indicator is used again to determine a new first group of move numbers. If at least one number still exists, then the method advances to step 24. At step 24, a second player's turn is determined. At step 26, the second player advances a first time by a number of positions corresponding to the first move number of the second group of move numbers. At step 28, the first move number used by the second player is removed from the second group of move numbers. At step 30, it is determined whether any more numbers exists in the second group of move numbers. If no more numbers exist, the method advances to step 32, where the indicator is used again to determine a new second group of move numbers. If at least one number still exists, then the method returns to step 14. The first player would then advance a second time by a number of positions corresponding to the second move number of the first group of move numbers. Play continues in this manner until one of the players wins the game.

Thus, the players know in advance at least a certain number of move numbers on which their moves will be based. Thus, an element of predictability is added, which in turn adds a skill aspect to the game.

Figure 2:
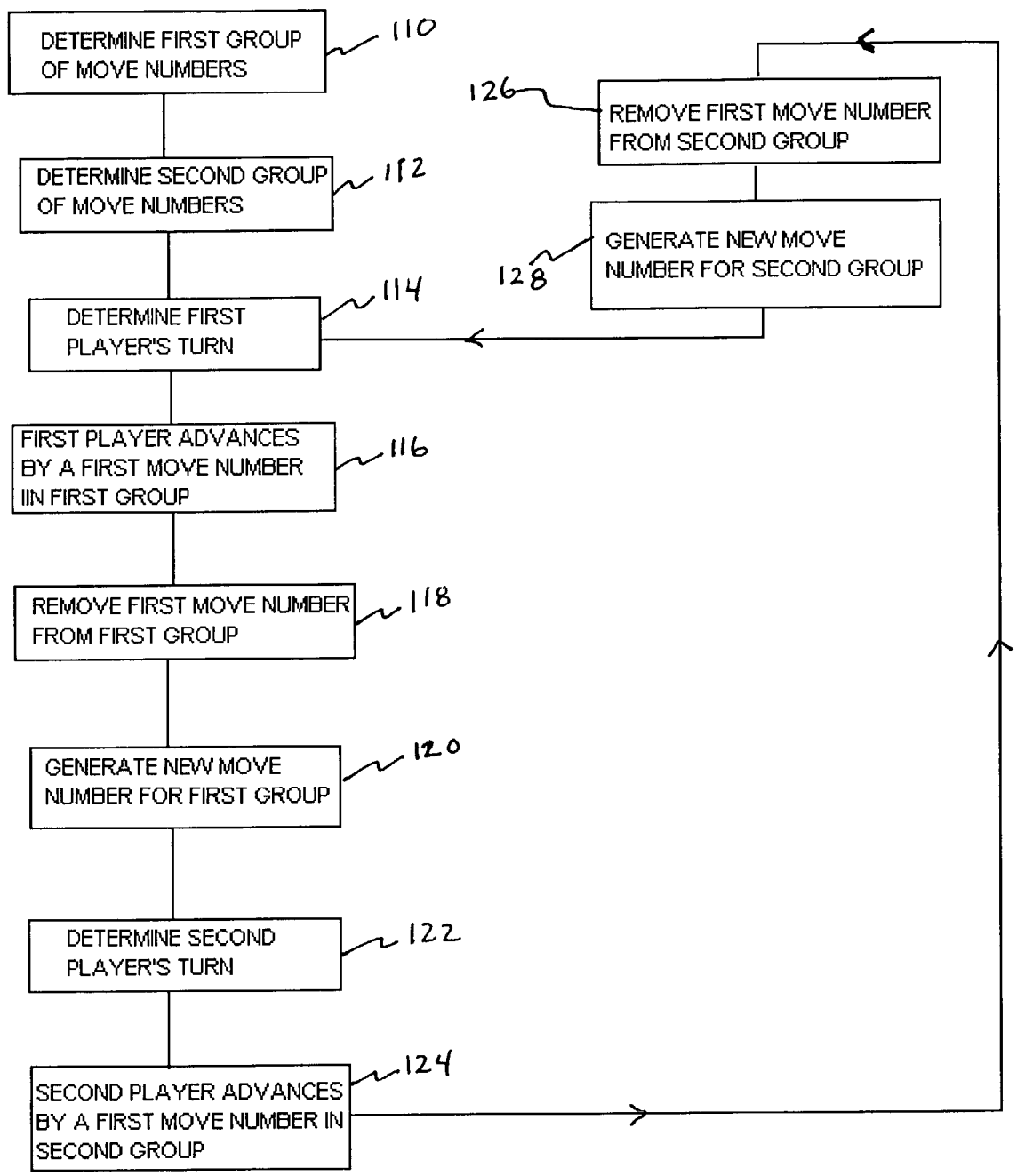
FIG. 2 is a flow chart representing a method in accordance with another embodiment of the present invention.

According to another embodiment, as depicted in FIG. 2, a method is provided, which is similar to that described in connection with the embodiment depicted in FIG. 1. At step 110, an indicator is used to determine a first group of move numbers. At step 112, the indicator is used to determine a second group of move numbers. In this embodiment, each group of move numbers may or may not be sequenced according to the order in which they were determined by activation of the indicator.

At step 114, a first player's turn is determined. At step 116, the first player advances a first time by a number of positions corresponding to a first move number selected from the one or more move numbers of the first group of move numbers. In the case where the move numbers are sequenced, the number selected would be the first move number of the sequence of move numbers in the first group. In the case where the move numbers are not sequenced, the number selected may be any of the move numbers of the first group. At step 118, the first move number selected by the first player is removed from the first group of move numbers. At step 120, the indicator is used to determine a new number to be included in the first group of move numbers. If the move numbers are sequenced, then the new number is added to the end of the sequence. If the numbers are not sequenced, then the new number is simply available for use by the first player as are all the rest of the numbers in the first group of move numbers. At step 122, a second player's turn is determined. At step 124 the second player advances a first time by a number of positions corresponding to a first move number selected from the one or more move numbers of the second group of move numbers. In the case where the move numbers are sequenced, then the number selected would be the first move number of the sequence of move numbers in the second group. In the case where the move numbers are not sequenced, the number selected may be any of the move numbers of the second group. At step 126, the first move number selected by the second player is removed from the second group of move numbers. At step 128, the indicator is used to determine a new number to be included in the second group of move numbers. If the move numbers are sequenced, then the new number is added to the end of the sequence. If the numbers are not sequenced, then the new number is simply available for use by the first player as are all the rest of the numbers in the second group of move numbers. The method then returns to step 114. Play continues until one of the player wins the game.

Figure 3:
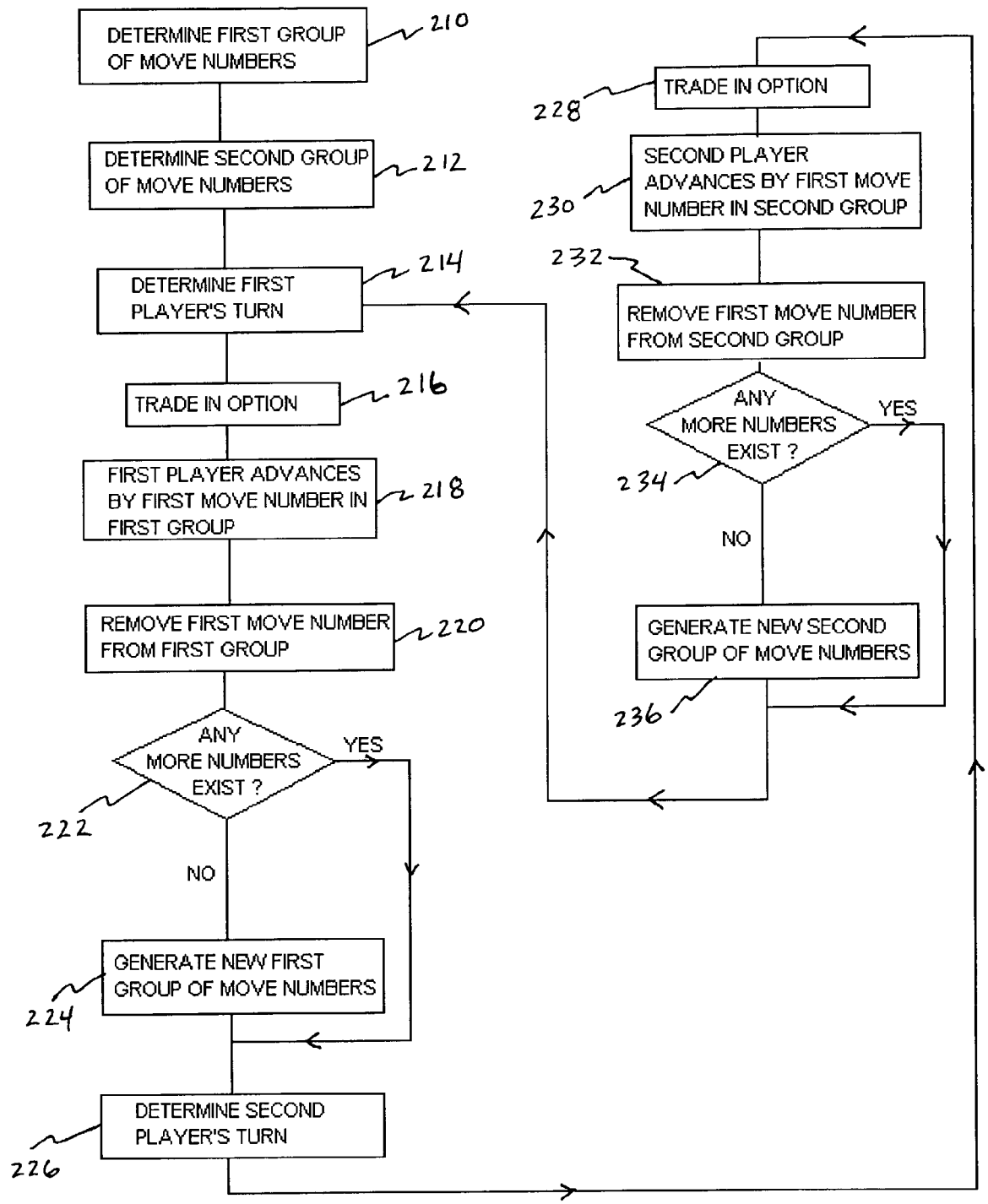
FIG. 3 is a flow chart representing a method in accordance with another embodiment of the present invention.

According to another embodiment, as depicted in FIG. 3, another method is provided. At step 210, an indicator is used to determine a first group of move numbers. At step 212, the indicator is used to determine a second group of move numbers. In this embodiment, each group of move numbers is preferably sequenced according to the order in which they were determined by activation of the indicator.

At step 214, a first player's turn is determined. At step 216, the first player may, at his option, trade in a certain number of move numbers from the first group of move numbers. The number of move number which may be traded in may be predetermined, or may be based on a certain criteria, such as how many moves the player has made or whether the first player is winning or losing. As an alternative, the first player may trade in up to a certain number of move numbers. The trading in of move numbers may be done in a manner similar to that of trading in cards in a draw poker game. The traded-in move numbers are replaced with substitute move numbers, which are thus added to the first group. Preferably, the number of substitute move numbers equals the number of traded-in move numbers. However, the number of substitute move numbers can be different from the number of traded-in move numbers.

At step 218, the first player advances a first time by a number of positions corresponding to the first move number of the first group of move numbers. At step 220, the first move number used by the first player is removed from the first group of move numbers. At step 222, it is determined whether any more move numbers exist in the first group of move numbers. If no more move numbers exist, the method advances to step 224 where the indicator is used again to determine a new first group of move numbers. If at least one move number still exists, then the method advances to step 226. At step 226, a second player's turn is determined. At step 228, the second player may, at his option, trade in a certain number of move numbers from the second group of move numbers. The same considerations apply here as in the case of the trading in option available to the first player as described above. At step 230, the second player advances a first time by a number of positions corresponding to the first move number of the second group of move numbers. At step 232, the first move number used by the second player is removed from the second group of move numbers. At step 234, it is determined whether any more move numbers exists in the second group of move numbers. If no more move numbers exist, the method advances to step 236, where the indicator is used again to determine a new second group of move numbers. If at least one move number still exists, then the method returns to step 218. The first player would then advance a second time by a number of positions corresponding to the second move number of the first group of move numbers. Play continues until one of the players wins the game.

Figure 4:
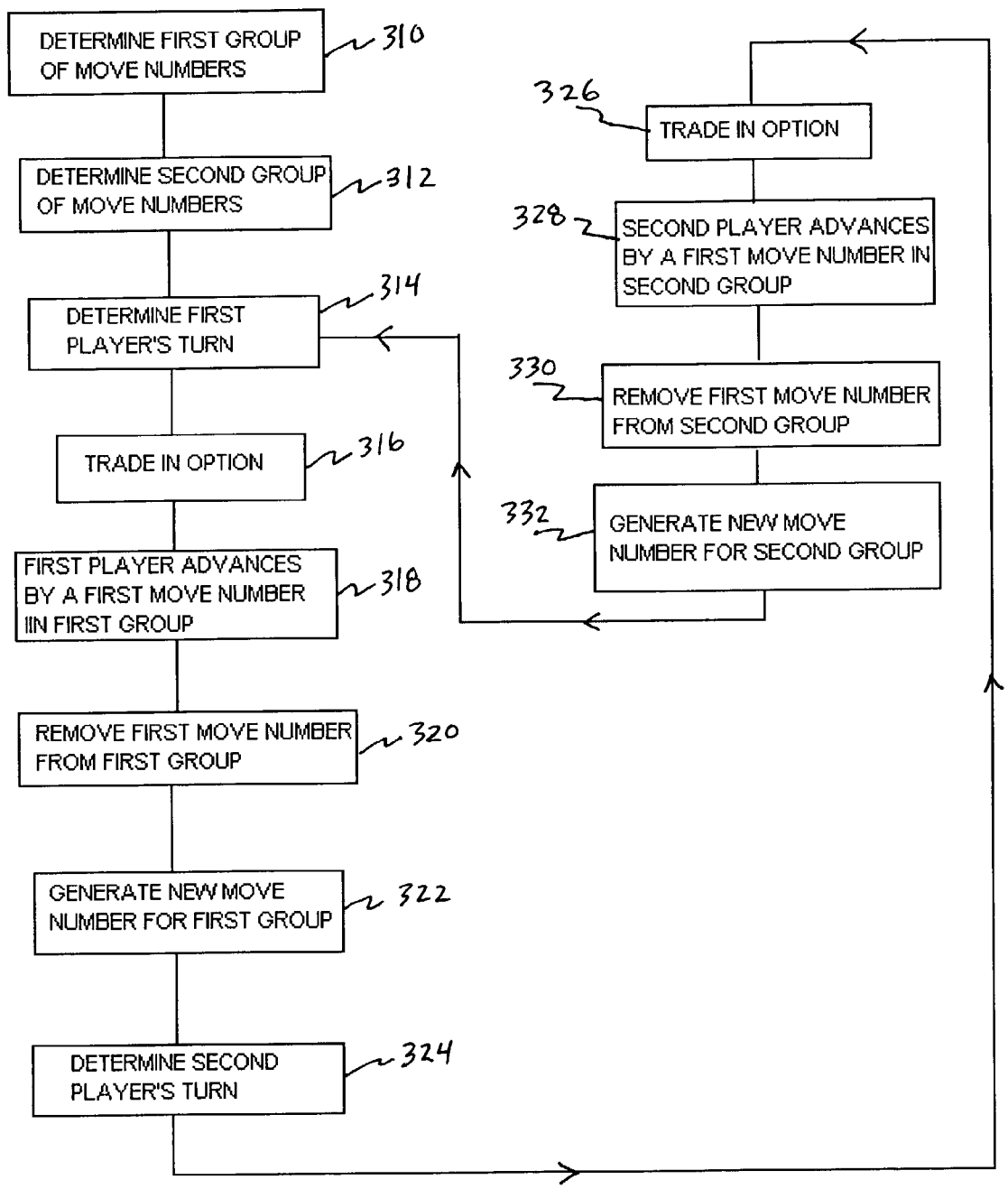
FIG. 4 is a flow chart representing a method in accordance with another embodiment of the present invention.

According to another embodiment, as depicted in FIG. 4, another method is provided that is similar to the method described in connection with FIG. 3. In this embodiment, at step 310, an indicator is used to determine a first group of move numbers. At step 312, the indicator is used to determine a second group of move numbers. In this embodiment, each group of move numbers may or may not be sequenced according to the order in which they were determined by activation of the indicator.

At step 314, a first player's turn is determined. At step 316, the first player may, at his option, trade in a certain number of move numbers from the first group of move numbers. In the case of sequenced move numbers, the substitute move numbers would preferably be located in the sequence in positions corresponding to the traded-in numbers they replace. Alternatively, they could be added to the sequence according to some other rule, such as being placed at the end in the order in which the substitute move numbers are determined or otherwise selected. In the case of a non-sequenced group of move numbers, the substitute move numbers are simply added to the group of move numbers to be available for moves as are any of the other move numbers within the group of move numbers.

At step 318, the first player advances a first time by a number of positions corresponding to a first move number selected from the one or more move numbers of the first group of move numbers. In the case where the numbers are sequenced, then the number selected would be the first move number of the sequence of move numbers in the first group. In the case where the numbers are not sequenced, the number selected may be any of the move numbers of the first group. At step 320, the first move number selected by the first player is removed from the first group of move numbers. At step 322, the indicator is used to determine a new move number to be included in the first group of move numbers. If the move numbers are sequenced, then the new move number is added to the end of the sequence. If the numbers are not sequenced, then the new move number is simply available for use by the first player as are all the rest of the move numbers in the first group of move numbers.

At step 324, a second player's turn is determined. At step 326, the second player may, at his option, trade in a certain number of move numbers from the first group of move numbers. The same considerations for trading in move numbers apply here as discussed above. At step 328, the second player advances a first time by a number of positions corresponding to a first move number selected from the one or more move numbers of the second group of move numbers. In the case where the move numbers are sequenced, then the move number selected would be the first move number of the sequence of move numbers in the second group. In the case where the move numbers are not sequenced, the move number selected may be any of the move numbers of the second group. At step 330, the first move number selected by the second player is removed from the second group of move numbers. At step 332, the indicator is used to determine a new move number to be included in the second group of move numbers. If the move numbers are sequenced, then the new move number is added to the end of the sequence. If the numbers are not sequenced, then the new move number is simply available for use by the first player as are all the rest of the move numbers in the second group of move numbers. The method then returns to step 318. Play continues until one of the player wins the game.

According to another embodiment, any of the methods described herein may be employed, except that the numbers determined by the indicator are not immediately revealed to the players. For example, if the method described in connection with FIG. 1 is employed, at steps 10 and 12, respectively, the indicator is used to determine first and second groups of move numbers. However, none of the move numbers is visible to either player until it is a player's turn to move. When it is determined, for instance, that it is the first player's turn to move for the first time, the first move number in the sequence would then be made visible to the players. None of the other move numbers of either the first or second groups of move numbers would be visible; although, they would already be determined. In an embodiment in which the groups of move numbers were not sequenced, the player would select one of the determined (yet not visible) move numbers. Then that move number would be made visible to the players. If dominos were being used as an indicator, for example, the dominos would be selected, but would remain face down until a player chose one for a given move.

According to another embodiment, a game or other application is provided. The game or other application comprises rules to implement any of the methods describe herein.

Figure 5:
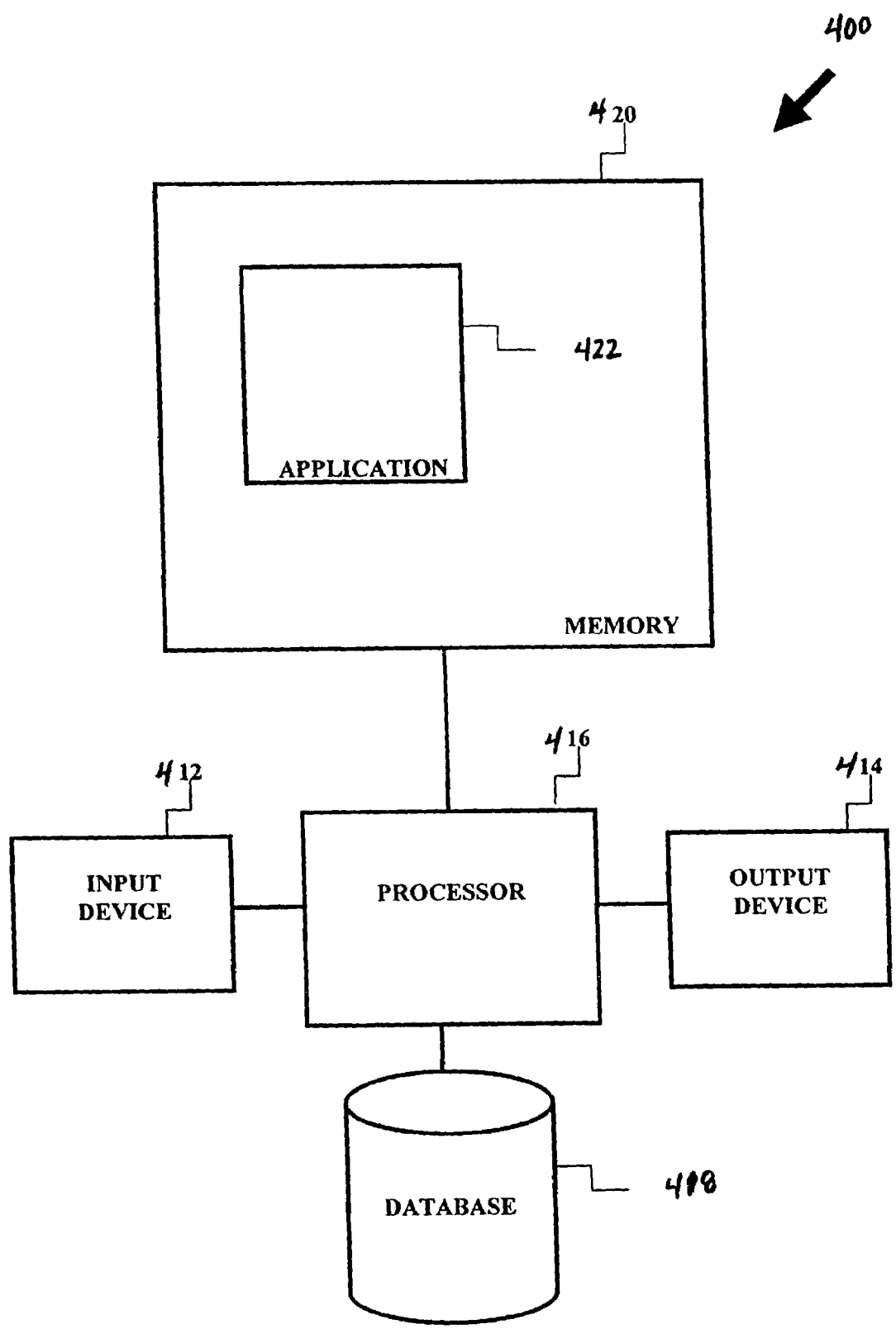
FIG. 5 is a system operable to implement the methods of FIGS. 1–4, and variations thereof, in accordance with an embodiment of the present invention.

According to another embodiment, a system is provided for implementing a game or other application which, in turn, implements any of the methods described herein. Preferably, as depicted in FIG. 5, the system 400 comprises an input device 412, an output device 414, a processor 416, a database 418, and memory 420. Input device 412 may include a pointing device such as a mouse, a track pad, a keyboard, and the like. Also, input device 412 may include a combination of these devices. Output device 414 may include a monitor, a printer, and the like, or any combination of such devices. Output device 414 is preferably operable to provide indications of moves, status, options, and any other relevant game or application information that may be useful to a user (or player).

Memory 420 includes computer software that my be executed by processor 416. The computer software may generally be identified by modules in memory 20. It will be understood that the computer software may be otherwise combined and/or divided for processing within the scope of the present invention. While only one processor is depicted, it should be understood that system 400 may comprise multiple processors. Further, any appropriate software platform may be utilized including functional or object-oriented programming.

The computer software may be loaded into memory 420 from disk storage (not explicitly shown). Disk storage may include a variety of types of storage media. For example, disk storage may include floppy disk drives, hard disk drives, CD or DVD drives, magnetic tape drives, or any other suitable storage media.

Database 418 preferably includes computer records that may be generally identified by tables. It will be understood that the computer records may be otherwise combined and/or divided within the scope of the present invention.

Preferably, one or more applications 422 are provided and are operable to be executed by processor 416. An application(s) 422 is preferably operable to perform any of the methods described herein, or any combination thereof, with input provided by a user (e.g., a player) through input device 412.

System 400 may be any type of computer system or other type of system operable to implement at least one of the methods described herein. System 400 may be an Internet- or Web-based system, for example, in which the application 422 might be executed on a server. It will be understood that system 400 may be otherwise configured within the scope of the present invention. For example, system 400 may operate as a stand alone system or may operate as a client-server networked system. Also, system 400 may operate in a network environment such as a LAN, WAN, intranet, extranet, or Internet.

In an alternative embodiment to any of the methods described above, system 400 automatically generates move numbers, and presents move numbers, or options (such as trading in move numbers) to a user. In another alternative embodiment to any of the methods described above, system 400 can automatically ensure that the total of the move numbers of one group of move numbers equals the total of any other group of move numbers. This ensures that each player has essentially the same total number of available moves, thereby further replacing a chance aspect with an aspect of skill. Optionally, system 400 can ensure that the total of move numbers of one group are within a predetermined range of the total of move numbers of another group.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method of making moves in a game, comprising:
   using an indicator to determine a plurality of numbers; and
   then advancing a number of positions corresponding to the plurality of numbers;
   wherein the using the indicator step comprises activating the indicator a predetermined plurality of times to determine a first sequence of a plurality of move numbers, and wherein after said first sequence is determined, the advancing step comprises advancing a first time, in a first turn of a first player, by a number of positions corresponding to a move number of the first sequence of move numbers and then advancing a second time, in a second turn of the first player, by a number of positions corresponding to another move number of the first sequence of move numbers, and wherein the second turn of the first player is after a first turn of a second player.

2. The method of claim 1, wherein the first move number of the first sequence is not used for advancing more than once during a number of advancements corresponding to the predetermined plurality of times the indicator is activated.

3. The method of claim 1, wherein the indicator comprises one or more die.

4. The method of claim 1, wherein the indicator comprises one or more dominos.

5. The method of claim 1, wherein a user participates in the game or application by taking turns, and wherein one or more move numbers of the first sequence of move numbers is visible to the user at times during the game or application other than the user's turn.

6. The method of claim 1, wherein a user participates in the game or application by taking turns, and wherein move numbers are invisible to the user until selected by the user upon the user's turn.

7. The method of claim 1, further comprising the step of trading in one or more move numbers for one or more substitute move numbers.

8. The method of claim 1, wherein the using the indicator step further comprises activating the indicator a predetermined number of times to determine a second sequence of one or more move numbers.

9. The method of claim 8, wherein the total of the move numbers of the first sequence of move numbers is within a predetermined range of the total of the move numbers of the second sequence of move numbers.

10. The method of claim 8, wherein the total of the move numbers of the first sequence of move numbers equals the total of the move numbers of the second sequence of move numbers.

11. A method of making moves in a game, comprising:
    using an indicator a first time to determine a plurality of numbers;
    then advancing a number of positions corresponding to the plurality of numbers;
    wherein the using the indicator step comprises activating the indicator a predetermined plurality of times to determine a first group of move numbers, and wherein after the first group of move numbers is determined, the advancing step comprises advancing a first time, in a first turn, by a number of positions corresponding to a first move number of the first group of move numbers; and
    using the indicator a second time during the first turn to determine a substitute move number to replace the first move number of the first group of move numbers.

12. The method of claim 11, wherein the step of using the indicator a second time is accomplished after the step of advancing a first time.

13. The method of claim 12, further comprising advancing a second time by a number of positions corresponding to a second move number of the first group of move numbers.

14. The method of claim 11, wherein the first group of move numbers comprises a sequence of a plurality move numbers.

15. The method of claim 11, wherein the indicator comprises one or more die.

16. The method of claim 11, wherein the indicator comprises one or more dominos.

17. The method of claim 11, wherein a user participates in the game or application by taking turns, and wherein one or more move numbers of the first group of move numbers is visible to the user at times during the game or application other than the user's turn.

18. The method of claim 11, wherein a user participates in the game or application by taking turns, and wherein move numbers are invisible to the user until selected by the user upon the user's turn.

19. The method of claim 11, further comprising the step of trading in one or more move numbers for one or more substitute move numbers.

20. The method of claim 11, wherein the using the indicator step further comprises activating the indicator a predetermined number of times to determine a second group of one or more move numbers.

21. The method of claim 20, wherein the total of the move numbers of the first group of move numbers is within a predetermined range of the total of the move numbers of the second group of move numbers.

22. The method of claim 20, wherein the total of the move numbers of the first group of move numbers equals the total of the move numbers of the second group of move numbers.

23. The method of claim 11, further comprising advancing a second time by a number of positions corresponding to a second move number of the first group of move numbers in a second turn.

24. The method of claim 23, wherein:

the first turn is associated with a first player; and the second turn is associated with a second player.

25. The method of claim 23, wherein the first and second turns are both associated with a first player, the first and second turns separated by a third turn of a second player.

26. A method of making moves in a game, comprising:

using an indicator to determine a plurality of numbers; and then advancing a number of positions corresponding to the plurality of numbers;

wherein the using the indicator step comprises activating the indicator a predetermined plurality of times to determine a first sequence of a plurality of move numbers, and wherein after said first sequence is determined, the advancing step comprises advancing a first time, in a first turn of a first player, by a number of positions corresponding to a move number of the first sequence of move numbers and then advancing a second time, in a first turn of the second player, by a number of positions corresponding to another move number of the first sequence of move numbers.

* * * * *